May 18, 1971 B. S. E. OSTBERG 3,579,418
METHOD AND APPARATUS FOR COMMON DIGESTION OF WOOD
CHIPS AND SAW DUST
Filed Sept. 18, 1968
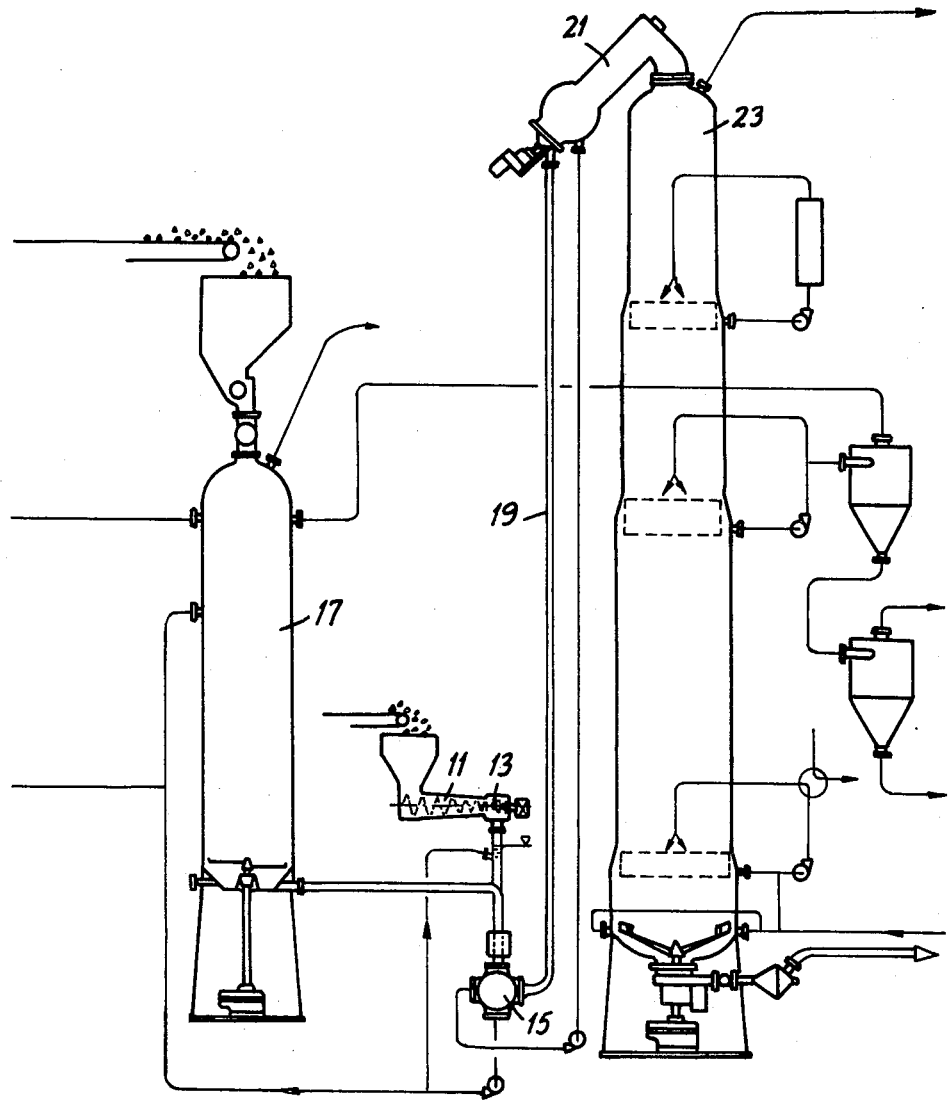
INVENTOR
Bengt Sven Erik Östberg
BY Cushman, Darby & Cushman
ATTORNEYS

United States Patent Office 3,579,418
Patented May 18, 1971

3,579,418
METHOD AND APPARATUS FOR COMMON DIGESTION OF WOOD CHIPS AND SAW DUST
Bengt Sven Erik Ostberg, Karlstad, Sweden, assignor to Aktiebolaget Kamyr, Karlstad, Sweden
Filed Sept. 18, 1968, Ser. No. 760,487
Claims priority, application Sweden, Sept. 21, 1967, 12,989/67
Int. Cl. D21c 7/06
U.S. Cl. 162—18                               6 Claims

ABSTRACT OF THE DISCLOSURE

A method and apparatus wherein saw dust is mixed with regular wood chips and digested. In order to prevent clogging of the screens in the chips feeding devices and the digester, coherent bodies, for example pellets or plugs, are formed out of the saw dust by compression. The cohesion of the bodies may be further improved by adding an adhesive or cementing agent. The saw dust bodies are added to the chips in the chute of the high-pressure feeder valve and are fed to the digester top by circulating liquid.

---

The object of the invention is to eliminate the drawbacks connected with the admixture of saw dust and similar finer particles into regular wood chips used for the manufacture of cellulosic pulp, such as clogging by said particles, of screens in the digester inlet end and the chips feeding devices thereof. The essential characterizing feature of the invention consists in that out of the finer wood material are formed bodies of approximately the same size as the particles of the coarser material before the two sizes of wood material are mixed and digested in common. In said bodies the particles cohere sufficiently for resisting the stresses in connection with charging them into the digester so that they are not broken up until later.

A plant for carrying out the method of the invention is shown diagrammatically in the enclosed drawing.

The invention is shown as applied to a cellulose digestion plant substantially of the known type shown in the U.S. patent application Ser. No. 447,179. However, the steaming vessel is replaced by a combined steaming and impregnating vessel of the design described in the U.S. patent application Ser. No. 666,737.

According to the invention said plant is completed with an additional feed line for saw dust (or a finer fraction of wood chips cut by a regular chipper and screened out). Said line comprises a press 11 which compresses the saw dust into a continuous fiber plug which is cut into pieces by means of a rotary knife 13. The bodies thus formed which may take the shape of discs, short cylinders or rods, briquettes, pellets etc., drop into the feed chute of the high-pressure feeder valve 15 and are there mixed with the coarser fiber material that has been steamed and impregnated with digesting liquor in the vessel 17. The two kinds of fiber material are conveyed in common to the digester top by means of liquid circulating in the conduit 19. In the screening device 21 said liquid is drawn off and returned to the feeder valve 15, whereas the fiber material is fed into the top of the digester 23.

The cohesion between the particles of the compressed bodies is sufficiently great to prevent said bodies from breaking up already in the screening device 21 which would involve clogging of the slits of the screening faces. The cohesion between the particles obtained by the compression may be increased by the addition in the press 11 of some suitable cement or binding means which is weakened or dissolved during the digestion.

Instead of the press 11 a pelletizing machine of any suitable kind can be used.

I claim:
1. In a method for digesting a cellulosic fiber material made up of relatively coarse particles and relatively fine particles, the improvement whereby clogging caused by the fine particles is avoided, said improvement comprising the steps of:
   (a) forming said fine particles into coherent bodies,
   (b) mixing said coherent bodies with said coarse particles, and
   (c) digesting the resulting mixture.
2. The method of claim 1 wherein said forming step is accomplished by compressing said fine particles into coherent bodies.
3. The method of claim 2 wherein said compressing is accompanied by the addition of a binder to said fine particles whereby the cohesion of said coherent bodies is improved.
4. The method of claim 1 further including the step of impregnating said coarse particles with digesting liquor before mixing said coarse particles with said coherent bodies.
5. The method of claim 1 wherein the coarser fiber material is impregnated with digesting liquor and then conveyed to the digesting step by means of circulating liquid, said bodies are mixed with the coarser fiber material after its impregnation with digesting liquor but before its introduction into said circulating liquid and said circulating liquid is separated from the mixture before digestion thereof.
6. An apparatus for digesting cellulosic fiber made up of relatively coarse particles and relatively fine particles, comprising a press and cutter means for forming said fine particles into coherent bodies, a mixer, a first supply line from said press and cutter means to said mixer, a second supply line to said mixer whereby said coarse particles are conveyed thereto, a digester, a liquid circulating means from said mixer to said digester for conveying the mixture of said coarse particles and coherent bodies to said digester in a liquid stream and a screen mounted at the intake of said digester for separating said liquid from said coarse particles and coherent bodies whereby only said coarse particles and coherent bodies are charged into said digester.

References Cited

UNITED STATES PATENTS

| | | | |
|---|---|---|---|
| 2,323,194 | 6/1943 | Beveridge et al. | 162—236 |
| 2,858,213 | 10/1958 | Durant et al. | 162—17 |
| 3,322,616 | 5/1967 | Hutchinson et al. | 162—238 |
| 3,367,495 | 2/1968 | Lea et al. | 162—55 |

S. LEON BASHORE, Primary Examiner

T. G. SCAVONE, Assistant Examiner

U.S. Cl. X.R.
162—19, 52, 246